United States Patent
Moses

(10) Patent No.: US 7,657,384 B1
(45) Date of Patent: Feb. 2, 2010

(54) MANAGEMENT OF RESPONSE TO TRIGGERING EVENTS IN CONNECTION WITH MONITORING FUGITIVE EMISSIONS

(75) Inventor: Rex Moses, Nassau Bay, TX (US)

(73) Assignee: Environmental Analytics, Inc., Nassau Bay, TX (US)

( * ) Notice: Subject to any disclaimer, the term of this patent is extended or adjusted under 35 U.S.C. 154(b) by 0 days.

(21) Appl. No.: 11/692,764

(22) Filed: Mar. 28, 2007

(51) Int. Cl.
*G01N 30/00* (2006.01)
*G06F 17/00* (2006.01)

(52) U.S. Cl. .................. 702/24; 702/23; 702/22; 702/26; 422/83; 422/94

(58) Field of Classification Search .................. 702/24, 702/23, 22, 26
See application file for complete search history.

(56) References Cited

U.S. PATENT DOCUMENTS

| | | | | |
|---|---|---|---|---|
| 4,603,235 | A * | 7/1986 | Crabbe, Jr. ................. | 379/290 |
| 5,099,437 | A * | 3/1992 | Weber ........................ | 702/187 |
| 5,206,818 | A * | 4/1993 | Speranza ..................... | 702/24 |
| 5,432,095 | A * | 7/1995 | Forsberg ..................... | 436/154 |
| 5,479,359 | A * | 12/1995 | Rogero et al. ................ | 702/24 |
| 5,563,335 | A * | 10/1996 | Howard ...................... | 73/46 |
| 6,345,234 | B1 * | 2/2002 | Dilger et al. ................. | 702/24 |
| 6,478,849 | B1 | 11/2002 | Taylor et al. | |
| 6,672,129 | B1 | 1/2004 | Frederickson et al. | |
| 6,722,185 | B2 * | 4/2004 | Lawson et al. ............... | 73/40 |
| 7,017,386 | B2 | 3/2006 | Liu et al. | |
| 7,136,904 | B2 | 11/2006 | Bartek et al. | |
| 7,298,279 | B1 * | 11/2007 | Badon et al. ................. | 340/605 |
| 7,369,945 | B2 | 5/2008 | Miller et al. | |
| 7,588,726 | B1 * | 9/2009 | Mouradian et al. ........... | 422/83 |
| 2002/0178789 | A1 * | 12/2002 | Sunshine et al. ............. | 73/31.06 |
| 2003/0012696 | A1 | 1/2003 | Millancourt | |
| 2003/0081214 | A1 | 5/2003 | Mestha et al. | |
| 2004/0005715 | A1 * | 1/2004 | Schabron et al. ............. | 436/104 |
| 2004/0011421 | A1 * | 1/2004 | Bartlett et al. ............... | 141/94 |
| 2004/0204915 | A1 * | 10/2004 | Steinthal et al. ............. | 702/188 |
| 2004/0226345 | A1 | 11/2004 | McCoy et al. | |
| 2004/0258213 | A1 | 12/2004 | Beamon et al. | |
| 2005/0286927 | A1 * | 12/2005 | Brenner ..................... | 399/91 |
| 2006/0020186 | A1 | 1/2006 | Brister et al. | |
| 2006/0246592 | A1 * | 11/2006 | Hashmonay ................. | 436/57 |
| 2008/0120043 | A1 | 5/2008 | Miller et al. | |

OTHER PUBLICATIONS

"2nd Annual Fugitive Emissions—Leak Detection and Repair Symposium"; ISA Technical Conference Brochure; Nov. 2002.

"Introducing the Allegro CX(TM) Field Computer"; Product Newswire (product announcement); Jun. 21, 2004.

(Continued)

*Primary Examiner*—Hal D Wachsman
(74) *Attorney, Agent, or Firm*—Pramudji Wendt & Tran, LLP; Ari Pramudji

(57) ABSTRACT

Method for managing a response to a triggering event in connection with a fugitive emissions monitor of a component. In one implementation, the method may include determining whether an input is a triggering event. If the input is a triggering event, then a message regarding the triggering event and one or more actions to remedy the triggering event may be displayed. The method may further include displaying one or more queries to confirm that the actions have been completed.

16 Claims, 5 Drawing Sheets

OTHER PUBLICATIONS

"New from Accutech, Wireless Acoustic Monitor Field Units Make Fugitive Emissions Monitoring Compliance Easy"; Product Announcement/Description; Feb. 10, 2004.

"LDARManager™ Makes Fugitive Emission Monitoring A Breeze TISCOR launches its newest product for Leak Detection and Repair"; product announcement/description; Nov. 8, 2002.

*Environmental Analytics, Inc.* v. *TMX2, Inc. and LDAR Solutions, Ltd.*; Case 4:08-cv-03353; USDC, Southern District of Texas; First Amended Complaint; Dec. 10, 2008.

Office Action (Aug 4, 2009); U.S. Appl. No. 12/032,499 (Moses, et al).

* cited by examiner

MANAGEMENT OF RESPONSE TO TRIGGERING EVENTS IN CONNECTION WITH MONITORING FUGITIVE EMISSIONS

BACKGROUND

1. Field of the Invention

Implementations of various technologies described herein generally relate to monitoring fugitive emissions and management of response to triggering events in connection with monitoring fugitive emissions.

2. Description of the Related Art

Industrial plants that handle volatile organic compounds (VOCs) sometimes experience unwanted emissions of those compounds into the atmosphere from point sources, such as smokestacks, and non-point sources, such as valves, pumps, and/or vessels containing the VOCs. Emissions from non-point sources typically occur due to leakage of the VOCs from joints and/or seals and may be referred to herein as "fugitive emissions". Fugitive emissions from control valves typically occur as leakage through the packing set around the valve stem. Control valves used in demanding service conditions involving large temperature fluctuations and frequent movements of the valve stem commonly suffer accelerated deterioration of the valve stem packing set.

The United States Environmental Protection Agency (EPA) has promulgated regulations specifying maximum permitted leakage of certain hazardous air pollutants, such as benzene, toluene, 1,1,1-trichloroethane, from certain components, e.g., control valves, pump seals, compressor agitators, valves, pipe connectors and the like. As such, the regulations require facility operators to perform periodic surveys of the emissions from these components. The survey interval frequency may be monthly, quarterly, semiannual, or annual. If the facility operator can document that a certain percentage of the components with excessive leakage are below a prescribed minimum, the required surveys become less frequent. Thus, achieving a low percentage of leaking valves reduces the number of surveys required per year, which may result in large cost savings.

In addition to conducting the surveys, facility operators may be required to comply with an array of regulatory, safety and commercial parameters. For example, facility operators may be required to repair identified leaks on the components and generate reports with proper codes in compliance regulatory, safety and commercial parameters. As another example, facility operators may be required to maintain proper calibration on the toxic vapor analyzers used to monitor the leakage. Most, if not all, of the surveys and compliance are typically performed manually by technicians. Unfortunately, due to the wide array of compliance parameters, some of these parameters are often not met.

SUMMARY

Implementations of various technologies described herein are directed to a method for managing a response to a triggering event in connection with a fugitive emissions monitor of a component. In one implementation, the method may include determining whether an input is a triggering event. If the input is a triggering event, then a message regarding the triggering event and one or more actions to remedy the triggering event may be displayed. The method may further include displaying one or more queries to confirm that the actions have been completed.

In another implementation, the method may include receiving a signal from a toxic vapor analyzer for analyzing fugitive emissions, determining whether the signal qualifies as a triggering event, and displaying one or more actions to remedy the triggering event.

In yet another implementation, the method may include receiving an input based on an observation of a component being monitored for fugitive emissions or the environment surrounding the component, determining whether the input qualifies as a triggering event, and displaying one or more actions to remedy the triggering event.

In still another implementation, the method may include monitoring an amount of time that that has lapsed during the fugitive emissions monitor, determining whether the amount of time that has lapsed exceeds a predetermined value, and displaying a message indicating that the amount of time that has lapsed has exceeded the predetermined value, if the amount of time that has lapsed has exceeded the predetermined value.

In still yet another implementation, the method may include measuring a temperature of an environment in which the component is disposed, determining whether the measured temperature qualifies as a triggering event, and if the measured temperature qualifies as a triggering event, then displaying a message indicating the triggering event and one or more actions to remedy the triggering event.

In still another implementation, the method may include receiving a signal from the toxic vapor analyzer, determining whether the toxic vapor analyzer is in condition ready to be used based on the signal, and if the toxic vapor analyzer is not in condition ready to be used, then displaying one or more actions to be taken to put the toxic vapor analyzer in condition ready to be used.

The above referenced summary section is provided to introduce a selection of concepts in a simplified form that are further described below in the detailed description section. The summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

Implementations of various technologies will hereafter be described with reference to the accompanying drawings. It should be understood, however, that the accompanying drawings illustrate only the various implementations described herein and are not meant to limit the scope of various technologies described herein.

DETAILED DESCRIPTION

The discussion below is directed to certain specific implementations. It is to be understood that the discussion below is only for the purpose of enabling a person with ordinary skill in the art to make and use any subject matter defined now or later by the patent "claims" found in any issued patent herein.

The following paragraphs generally describe one or more implementations of various techniques directed to managing a response to a triggering event in connection with a fugitive emissions monitor. In one implementation, a user, such as a technician, may use a probe to obtain an air sample from a component. The air sample may be transferred to a toxic vapor analyzer (TVA), which may then analyze, determine a parts per million (PPM) level corresponding to the air sample, convert the PPM level to a binary signal and send the signal to a handheld personal computer (PC), which contains a triggering event monitoring program. The triggering event monitoring program may then determine whether the binary signal qualifies as a triggering event. If it does, then the even monitoring program will display a message on the handheld PC indicating the triggering event and the steps that need to be taken to remedy the triggering event.

The various technologies and techniques for managing a response to a triggering event in connection with a fugitive emissions monitor in accordance with various implementations are described in more detail with reference to FIGS. 1-6 in the following paragraphs.

Figure 1:
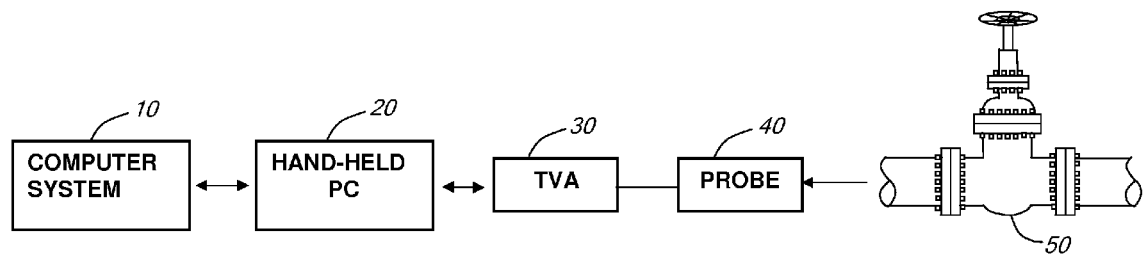
FIG. 1 illustrates a schematic diagram of an environment in which various technologies and techniques described herein may be implemented.

FIG. 1 illustrates an environment 100 in which various technologies and techniques described herein may be implemented. The environment 100 includes a computer system 10 that may include various applications and/or programs for managing and storing information pertaining to fugitive emissions detection. The computer system 10 will be described in more detail with reference to FIG. 2. The computer system 10 may be in communication with a handheld personal computer (PC) 20, which may commonly be referred to as a personal digital assistant (PDA). The handheld PC 20 will be described in more detail with reference to FIG. 3. In one implementation, the computer system 10 may be in communication with the handheld PC 20 through a wireless network, which may include Bluetooth technology, Spread Spectrum, Broadband, Wi-Fi and the like.

The handheld PC 20 may be in communication with a toxic vapor analyzer (TVA) 30, which may be configured to detect volatile organic chemicals, emissions gases, nitroaromatics, chemical warfare agents and the like. In one implementation, the TVA 30 is TVA-1000 available from The Foxboro Company out of Massachusetts, USA. However, it should be understood that some implementations may use other types of TVA's. The TVA 30 may include a probe 40 for receiving an air sample from a component 50, such as control valves, pump seals and the like. The TVA 30 may be in communication with the handheld PC 20 through a wireless network, which may include Bluetooth technology, Spread Spectrum, Broadband, Wi-Fi and the like.

Figure 2:
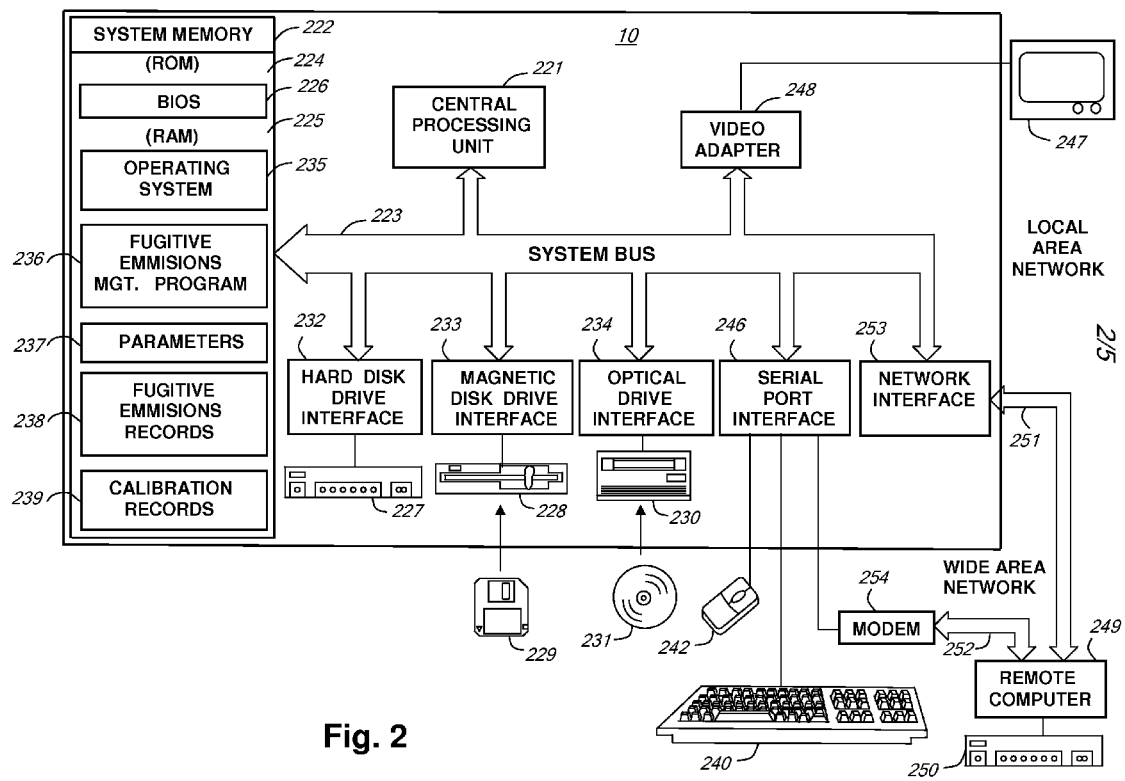
FIG. 2 illustrates a schematic diagram of a computer system that may be used in connection with implementations of various technologies described herein.

FIG. 2 illustrates the computer system 10 in more detail in accordance to implementations of various technologies described herein. The computer system 10 may include a central processing unit (CPU) 221, a system memory 222 and a system bus 223 that couples various system components including the system memory 222 to the CPU 221. Although only one CPU is illustrated in FIG. 2, it should be understood that in some implementations the computer system 10 may include more than one CPU. The system bus 23 may be any of several types of bus structures, including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus. The system memory 222 may include a read only memory (ROM) 224 and a random access memory (RAM) 225. A basic input/output system (BIOS) 226, containing the basic routines that help transfer information between elements within the computer system 10, such as during start-up, may be stored in the ROM 224.

The computer system 10 may further include a hard disk drive 227 for reading from and writing to a hard disk, a magnetic disk drive 228 for reading from and writing to a removable magnetic disk 229, and an optical disk drive 230 for reading from and writing to a removable optical disk 231, such as a CD ROM or other optical media. The hard disk drive 227, the magnetic disk drive 28, and the optical disk drive 230 may be connected to the system bus 223 by a hard disk drive interface 232, a magnetic disk drive interface 233, and an optical drive interface 234, respectively. The drives and their associated computer-readable media may provide nonvolatile storage of computer-readable instructions, data structures, program modules and other data for the computer system 10.

Although the computer system 10 is described herein as having a hard disk, a removable magnetic disk 229 and a removable optical disk 231, it should be appreciated by those skilled in the art that the computing system 100 may also include other types of computer-readable media that may be accessed by a computer. For example, such computer-readable media may include computer storage media and communication media. Computer storage media may include volatile and non-volatile, and removable and non-removable media implemented in any method or technology for storage of information, such as computer-readable instructions, data structures, program modules or other data. Computer storage media may further include RAM, ROM, erasable programmable read-only memory (EPROM), electrically erasable programmable read-only memory (EEPROM), flash memory or other solid state memory technology, CD-ROM, digital versatile disks (DVD), or other optical storage, magnetic cassettes, magnetic tape, magnetic disk storage or other magnetic storage devices, or any other medium which can be used to store the desired information and which can be accessed by the computer system 10. Communication media may embody computer readable instructions, data structures, program modules or other data in a modulated data signal, such as a carrier wave or other transport mechanism and may include any information delivery media. The term "modulated data signal" may mean a signal that has one or more of its characteristics set or changed in such a manner as to encode information in the signal. By way of example, and not limitation, communication media may include wired media such as a wired network or direct-wired connection, and wireless media such as acoustic, RF, infrared and other wireless media. Combinations of any of the above may also be included within the scope of computer readable media.

A number of program modules may be stored on the hard disk, magnetic disk 229, optical disk 231, ROM 224 or RAM 225, including an operating system 235, a fugitive emissions management program 236, fugitive emissions parameters 237, fugitive emissions recordings 238 and calibration records 239. The operating system 35 may be any suitable operating system that may control the operation of a networked personal or server computer, such as Windows® XP, Mac OS® X, Unix-variants (e.g., Linux® and BSD®), and the like. The fugitive emissions management program 236 may be configured to manage the fugitive emissions parameters 237, the fugitive emissions recordings 238 and the calibration records 239. The fugitive emissions parameters 237 may be based on client specifications, safety hazards parameters, risk management parameters and regulatory/compliance protocols. The calibration records 239 may include calibration records for TVA's.

A user may enter commands and information into the computer system 10 through input devices such as a keyboard 240 and pointing device 242. The input devices may be connected to the CPU 221 through a serial port interface 246 coupled to system bus 223, but may be connected by other interfaces, such as a parallel port, game port or a universal serial bus (USB). A monitor 247 or other type of display device may also be connected to system bus 223 via an interface, such as a video adapter 248.

Further, the computer system 10 may operate in a networked environment using logical connections to one or more remote computers, such as a remote computer 249. Although the remote computer 249 is illustrated as having only a memory storage device 250, the remote computer 249 may include many or all of the elements described above relative to the computer system 10. The logical connections may be any connection that is commonplace in offices, enterprise-wide computer networks, intranets, and the Internet, such as local area network (LAN) 251 and a wide area network (WAN) 252.

When using a LAN networking environment, the computer system 10 may be connected to the local network 251 through a network interface or adapter 253. When used in a WAN networking environment, the computer system 10 may include a modem 254, wireless router or other means for establishing communication over a wide area network 252, such as the Internet. The modem 254, which may be internal or external, may be connected to the system bus 223 via the serial port interface 246. In a networked environment, program modules depicted relative to the computer system 10, or portions thereof, may be stored in a remote memory storage device 250. It will be appreciated that the network connections shown are exemplary and other means of establishing a communications link between the computers may be used.

The remote computer 249 may be another personal computer, a server, a router, a network PC, a peer device or other common network node. In one implementation, the remote computer 249 may be the handheld PC 20 described with reference to FIG. 1. As such, the handheld PC 20 may include many or all of the elements described above relative to the computer system 10. For example, in FIG. 3, the handheld PC 20 is illustrated as having a CPU 321, a system memory 322 and a system bus 323 that couples various system components to the CPU 321. The system memory 322 may include a read only memory (ROM) 324 and a random access memory (RAM) 325. The handheld PC 20 may further include a hard disk drive 327 for reading from and writing to a hard disk. The hard disk drive 327 may be connected to the system bus 323 by a hard disk drive interface 332. One difference between the computer system 10 and the handheld PC 20 is the various programs stored in memory. For example, the handheld PC 20 may include a fugitive emissions monitoring program 310 and a triggering event monitoring program 320. The fugitive emissions monitoring program 310 may be configured to identify the various components to be tested and accept readings from the TVA 30. The triggering event monitoring program 320 may be configured to manage responses to triggering events. The operation of the fugitive emissions monitoring program 310 and a triggering event monitoring program 320 will be described in more detail in the following paragraphs with reference to FIG. 4.

Figure 4:
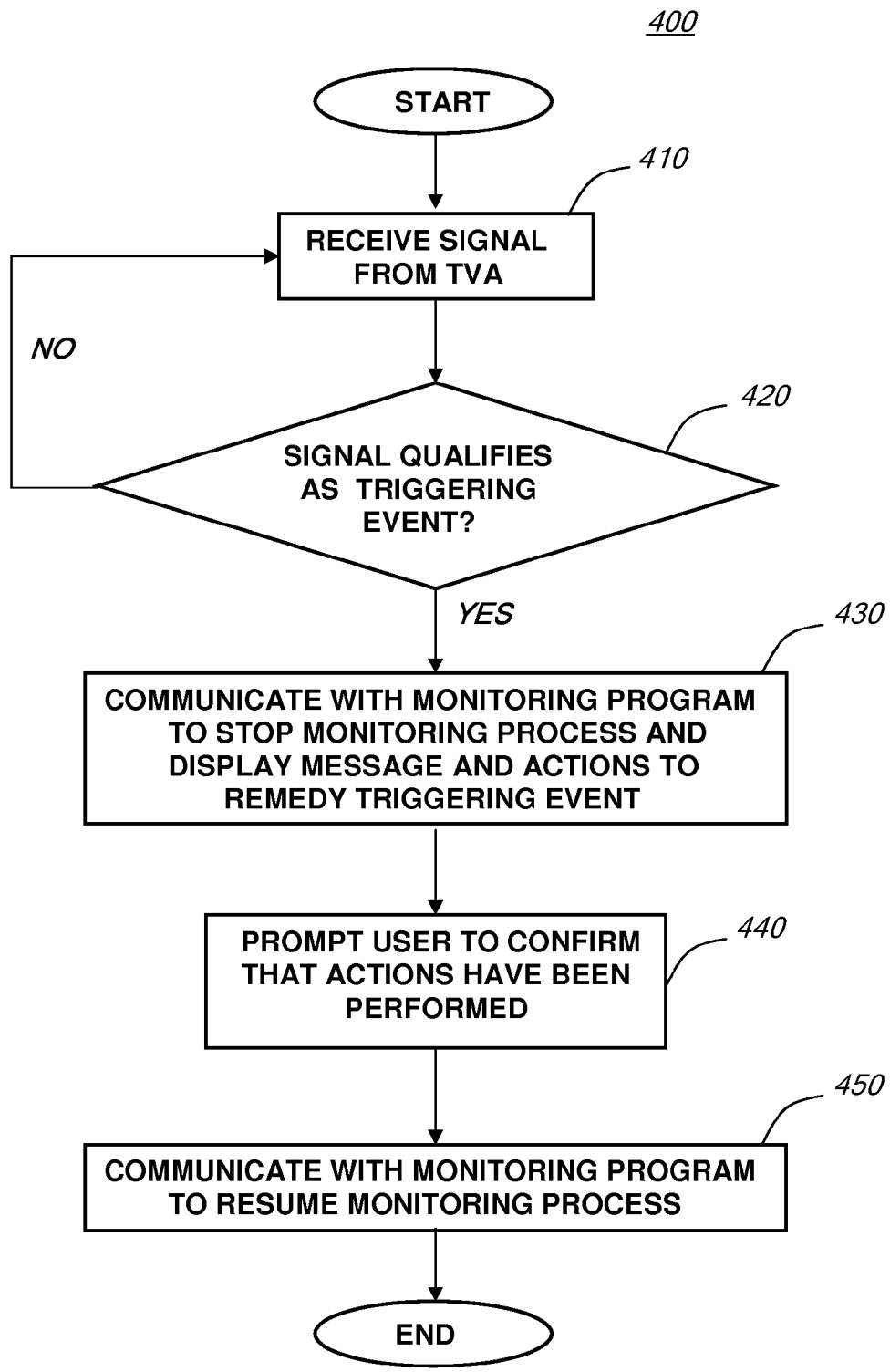
FIG. 4 illustrates a flow diagram of a method for managing a response to a triggering event in connection with a fugitive emissions monitor in accordance with implementations of various technologies and techniques described herein.

FIG. 4 illustrates a flow diagram of a method 400 for managing a response to a triggering event in connection with a fugitive emissions monitor in accordance with implementations of various technologies and techniques described herein. It should be understood that while the flow diagram indicates a particular order of execution of the operations, in some implementations, the operations might be executed in a different order. In one implementation, the method 400 may be performed by the triggering event monitoring program 320.

At step 410, a signal may be received by the handheld PC 20 from the TVA 30. The signal may be generated by the TVA 30 in response to receiving an air sample collected by the probe 40. Further, the signal may be transmitted wirelessly from the TVA 30 to the handheld PC 20. The air sample may be collected from a leak interface on a component, such as a control valve, pump seal and the like. In one implementation, upon receipt of the air sample, the TVA 30 may analyze the air sample, determine a parts per million (PPM) level for the air sample, convert the PPM level to a binary signal and send the binary signal to the triggering event monitoring program 320. The triggering event monitoring program 320 may then forward the binary signal to the fugitive emissions monitoring program 310.

At step 420, a determination is made as to whether the received signal qualifies as a triggering event. If the signal is determined as a triggering event, then the monitoring process is stopped and a message with a set of actions to remedy the triggering event may be displayed (step 430). In one implementation, the triggering event monitoring program 320 may communicate with the fugitive emissions monitoring program 310 to halt the monitoring process. At step 440, the triggering event monitoring program 320 may prompt a user, such as a technician, to confirm that the actions displayed in the previous step have been performed. At step 450, the monitoring process may be resumed. The triggering event monitoring program 320 may communicate with the fugitive emissions monitoring program 310 to resume the monitoring process.

In one implementation, if the received binary signal does not qualify as a triggering event, then the triggering event monitoring program 320 forwards the binary signal to the fugitive emissions monitoring program 310, which records the date, time and the corresponding PPM reading of the binary signal. On the other hand, if the received binary signal qualifies as a triggering event, then the triggering event monitoring program 320 forwards the actions that have been performed to remedy the triggering event to the fugitive emissions monitoring program 310 along with the binary signal.

The following table illustrates a number of triggering events, messages corresponding to those triggering events and a set of actions to remedy those triggering events.

| Triggering Event | Message | Actions |
|---|---|---|
| PPM level corresponding to signal ex- | Leak!<br>Report leak | Specific steps based on client location |

-continued

| Triggering Event | Message | Actions |
| --- | --- | --- |
| ceeds a predetermined PPM level, e.g., 500 PPM | | and specifications |
| No signal from TVA | TVA malfunction | Look for flame out, dead battery of TVA, $H_2$ refill |
| Background PPM level exceeds a predetermined value | Background PPM level exceeds maximum value | Notify client/supervisor and obtain signature |
| Exceeds a predetermined PPM level, e.g., 10,000 PPM, for HRVOC | Leak! Report leak | Notify client/supervisor and obtain signature |
| PPM level of a predetermined number of components is below a predetermined value | Notify client/supervisor | Notify client/supervisor and obtain signature |
| A number of components in an area of a facility have exceeded a predetermined PPM level | Leaks! Report to client/supervisor | Stop monitoring Report to client/supervisor |

Figure 5:
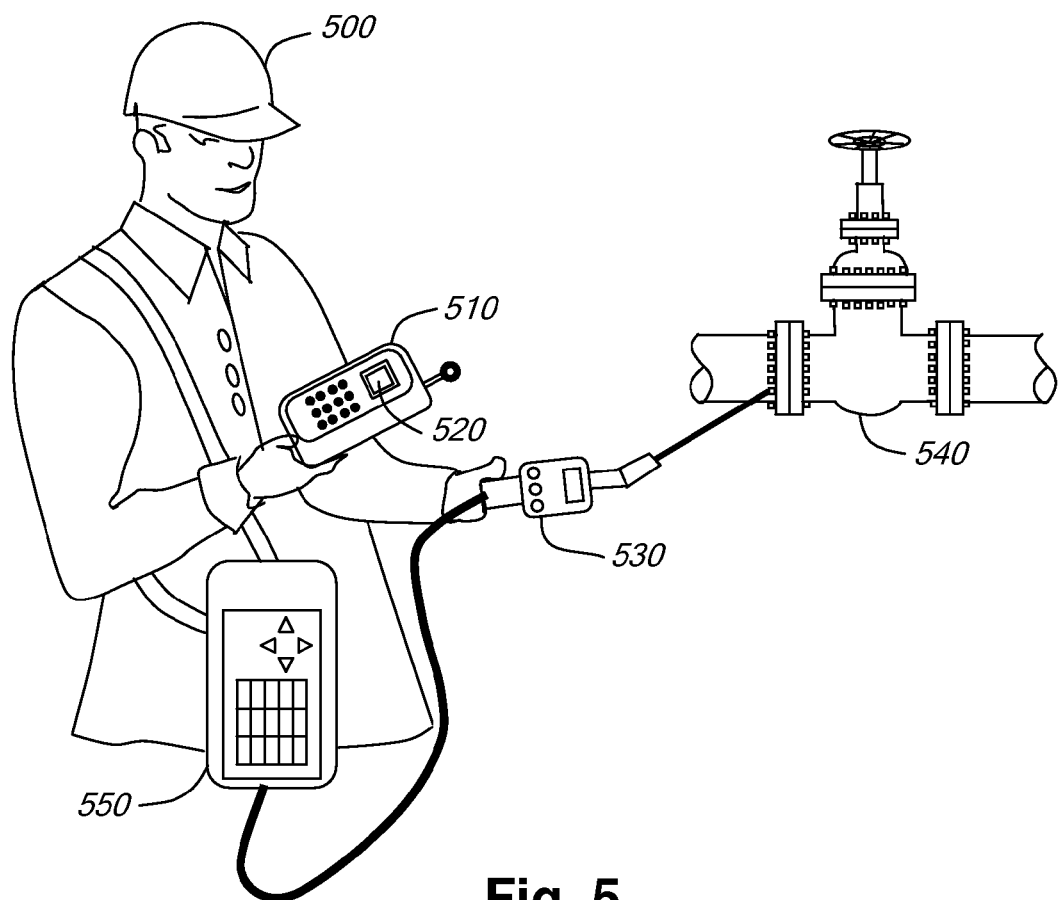
FIG. 5 illustrates a schematic diagram of a technician using a handheld PC having the triggering event monitoring program that operates in accordance with one implementation described with reference to FIG. 4.

FIG. 5 illustrates a schematic diagram of a technician 500 using a handheld PC 510 having the triggering event monitoring program 520 that operates in a manner described with reference to FIG. 4. The technician 500 may use a probe 530 to obtain an air sample from a component 540. The air sample may then be transferred to a toxic vapor analyzer (TVA) 550 attached to the back of the technician 500. The TVA 550 may then analyze the air sample, determine a parts per million (PPM) level for the air sample, convert the PPM level to a binary signal and send the binary signal to the handheld PC 510. The binary signal may then be processed according to the steps described with reference to FIG. 4.

In one implementation, referring back to step 410, the triggering event monitoring program 320 may receive a manual input from the technician, rather than a signal from the TVA 30. The manual input may be based on an observation by the technician. Examples of such observation include audio visual olfactory (AVO) detection, open-ended line (OEL) detection, leaker tag, an alarm and the like. For such examples, the actions to remedy the triggering events may include requiring some input regarding the type and location of the observation, sending a notification to the client/supervisor and obtaining a signature.

Figure 6:
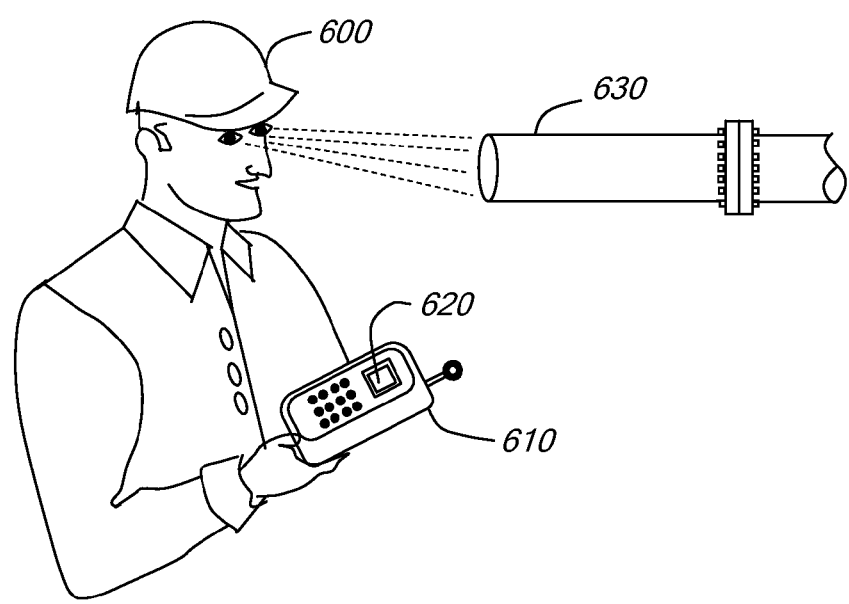
FIG. 6 illustrates a schematic diagram of a technician using a handheld PC having the triggering event monitoring program that operates in accordance with another implementation described with reference to FIG. 4.

FIG. 6 illustrates a schematic diagram of a technician 600 using a handheld PC 610 having the triggering event monitoring program 620 that operates in a manner described with reference to FIG. 4 and the above paragraph. The technician 600 may manually enter an input into the handheld PC 610 in response to his observation of the environment surrounding a component 630. In response to receiving the input, the triggering event monitoring program 620 may determine whether the input qualifies as a triggering event. If the input is a triggering event, then the triggering event monitoring program 620 may display the steps to be taken to remedy the triggering event.

In another implementation, referring back to step 420, in lieu of making a determination of a triggering event based on a signal from the TVA 30, a determination of the triggering event may be made based on time. The following table provides examples of triggering events based on time.

| Triggering Event | Message | Actions |
| --- | --- | --- |
| Monitoring time for a component exceeds a predetermined amount of time | Monitoring time exceeds maximum time | Report excess time |
| Deployment time exceeds a predetermined amount of time | Deployment time exceeds maximum time | Report excess time |
| Allotted time to obtain a work permit exceeds a predetermined amount of time | Time to obtain work permit exceeds maximum time | Report excess time |
| Allotted time for lunch or break exceeds a predetermined amount of time | Lunch or break time exceeds maximum time | Report excess time |

In yet another implementation, the determination of the triggering event may be based on climate, e.g., temperature. For example, a message may be displayed to the user with instructions to avoid a heat stroke or a frost bite. In this implementation, the user may be asked to provide information regarding the climate conditions. The triggering event monitoring program may then display certain steps to be taken to remedy the climate conditions.

In still yet another implementation, the triggering event monitoring program 620 may be configured to determine whether the TVA 30 has been properly calibrated. As such, at the beginning of each day, the calibration record of the TVA 30 may be transmitted wirelessly to the handheld PC 20. The triggering event monitoring program 620 may then determine whether the calibration record meets the calibration requirements for that particular TVA 30. If it is determined that the calibration record does not meet the calibration requirements, then the triggering event monitoring program 620 may display a message indicating to the technician that the TVA 30 has not been properly calibrated and the steps that need to be taken to properly calibrate the TVA 30.

In other implementations, the triggering event monitoring program 620 may be configured to confirm a number of factors or events associated with the TVA 30 or the fugitive emissions monitor. The table below provides a number of possible events that may be determined using the triggering event monitoring program 620.

| Triggering Events | Message | Actions |
| --- | --- | --- |
| Technician selects a TVA that does not include PID mode if needed for assigned components. | Select TVA with PID capabilities. | Prevent technician from using selected analyzer |
| Drift assessment for TVA does not match requirements | Improper drift assessment | Recalibrate TVA for proper drift assessment |

-continued

| Triggering Events | Message | Actions |
| --- | --- | --- |
| Technician attempts to transfer monitoring data before conducting an end-of-day drift assessment. | End-of-day drift assessment is required before transferring | Perform drift assessment |
| No receipt of signal corresponding to technician code | No technician code | Enter technician code prior to deployment |
| No input for confirming date/time on handheld PC | Date/time on handheld PC must be confirmed before deployment | Confirm date/time on handheld PC |
| No input for confirming TVA identification number | No TVA ID | Enter TVA ID before deployment |
| Selection of a component located in a confined space | Display site specific protocol for monitoring components in confined spaces | Obtain signature of their fire watch. |
| Selection of a component that is difficult to monitor | Display site specific protocol for monitoring difficult to monitor component | Confirm protocol standards |
| Selection of a component that requires a ladder | Display site specific protocol for monitoring components with a ladder | Confirm protocol standards |
| Selection of a component that requires a man lift | Display site specific protocol for monitoring with a man lift | Confirm protocol standards |
| Selection of a component that requires a crane | Display site specific protocol for monitoring with a crane | Confirm protocol standards |
| Selection of a component that requires a scaffold | Display site specific protocol for monitoring with a scaffold. | Confirm protocol standards |
| Selection of a component that requires a harness and lanyard | Display site specific protocol for monitoring with a harness and lanyard. | Confirm protocol standards |
| Selection of a component that was previously labeled as difficult to find (DTF) and determined as a triggering event | Component need resolution | Confirm location and status of component |
| Tech is injured | Display site specific protocol for first aid treatment and map of first aid station | Record type of first aid obtained, details of injury, and person to whom reported |
| Technician has begun monitoring a component | Status bar indicating the amount of time that has lapsed and the minimum amount of time required | Cannot save reading until minimum time has been met |
| A leak is identified on a component having a diameter greater than a predetermined value | Monitor longer and status bar is reset to capture additional time | Cannot save reading until additional monitoring time has been met |

Various implementations described herein are configured to identify triggering events and guarantee technician awareness of the triggering events by intervening in the operation of the underlying program and displaying a pre-set array of alerts, instructions and action steps to be taken. In this manner, various implementations described herein may ensure proper assessment of the triggering events on the part of the technician by prompting the appropriate response to an array of questions and then comparing the responses given against the set of appropriate responses. In addition, various implementations described herein may ensure sufficient documentation of the assessment and the required action steps. The alert, awareness and assessment loop may ensure the technician's proper response to a triggering event according to a previously designated set of protocols, instructions, checklists and/or timelines. Various implementations described herein may also document the successful completion of each step along with the technician's assessment of any relevant circumstance associated with the triggering events and follow up steps. In the end, the triggering event monitoring program may report the circumstances and final result of each intervention to a software program that enables management to review and respond appropriately to each intervention.

It should be understood that the various technologies described herein may be implemented in connection with hardware, software or a combination of both. Thus, various technologies, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the various technologies. In the case of program code execution on programmable computers, the computing device may include a processor, a storage medium readable by the processor (including volatile and non-volatile memory and/or storage elements), at least one input device, and at least one output device. One or more programs that may implement or utilize the various technologies described herein may use an application programming interface (API), reusable controls, and the like. Such programs may be implemented in a high level procedural or object oriented programming language to communicate with a computer system. However, the program(s) may be implemented in assembly or machine language, if desired. In any case, the language may be a compiled or interpreted language, and combined with hardware implementations.

While the foregoing is directed to implementations of various technologies described herein, other and further implementations may be devised without departing from the basic scope thereof, which may be determined by the claims that follow. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for managing a response to a fugitive emissions monitor of a component, comprising:
   determining whether a signal from a toxic vapor analyzer (TVA) has been received;
   if no signal from the TVA has been received, then determining that the TVA has malfunctioned;
   displaying a message indicating that the TVA has malfunctioned due to a flame out and a first instruction to determine the status of a flame inside the TVA; and
   displaying one or more queries to confirm that the first instruction has been performed.

2. The method of claim 1, wherein the signal is a binary signal.

3. The method of claim 1, further comprising displaying a second instruction to determine the status of a battery of the TVA.

4. The method of claim 1, further comprising displaying a third second instruction to refill the TVA with $H_2$.

5. The method of claim 1, further comprising displaying a second instruction to provide a remedy for addressing the flame out.

6. A method for managing a response to a fugitive emissions monitor of a component, comprising:
   determining whether a parts per million (PPM) level of an air sample detected by a toxic vapor analyzer (TVA) exceeds a predetermined amount;
   if it is determined that the PPM level of the air sample exceeds the predetermined amount, then displaying a message indicating an existence of a leak on the component and a set of instructions to notify a supervisor and obtain a signature of the supervisor; and
   displaying one or more queries to confirm that the set of instructions has been performed.

7. A method for monitoring a component for fugitive emissions, comprising:
   calculating a first amount of time to monitor the component;
   determining whether a deflection in a signal received from a toxic vapor analyzer has occurred while the component is being monitored during the first amount of time; and
   if the deflection in the signal has occurred, then displaying a first message to instruct an operator to monitor the component for a second amount of time at the conclusion of the first amount of time.

8. The method of claim 7, wherein the first amount of time is based on the type, size or specific characteristics of the component.

9. The method of claim 7, wherein the second amount of time is based on the type, size or specific characteristics of the component.

10. The method of claim 7, further displaying a second message that indicates an amount of time that has lapsed while monitoring the component.

11. The method of claim 7, further comprising:
    receiving a reading regarding the component;
    determining whether the second amount of time has lapsed; and
    if the second amount of time has not lapsed, then displaying a second message to indicate that the reading is not stored.

12. The method of claim 7, wherein the second amount of time is measured from the time at which the deflection in the signal is determined after the conclusion of the first amount of time.

13. The method of claim 7, wherein the first message is displayed at the end of the first amount of time.

14. The method of claim 7, wherein the second amount of time is measured from a last increase in parts per million (PPM) level detected during the second amount of time.

15. The method of claim 14, wherein the second amount of time is configured to ensure that the deflection in the signal is completely measured.

16. The method of claim 7, wherein the deflection in the signal represents an elevated parts per million (PPM) reading.

* * * * *

UNITED STATES PATENT AND TRADEMARK OFFICE
CERTIFICATE OF CORRECTION

| | | |
|---|---|---|
| PATENT NO. | : 7,657,384 B1 | Page 1 of 1 |
| APPLICATION NO. | : 11/692764 | |
| DATED | : February 2, 2010 | |
| INVENTOR(S) | : Rex Moses | |

Figure 3:
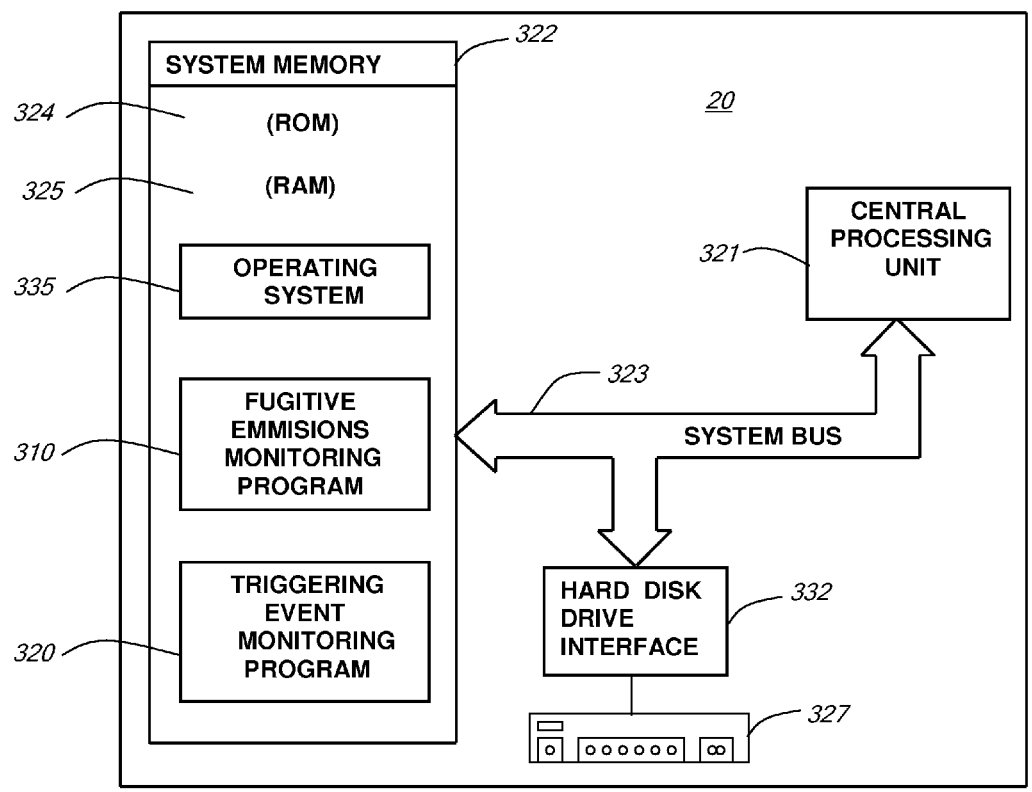
FIG. 3 illustrates a schematic diagram a handheld PC in which various technologies and techniques described herein may be implemented.

It is certified that error appears in the above-identified patent and that said Letters Patent is hereby corrected as shown below:

Column 2, line 57:
   should read -- "FIG. 3 illustrates a schematic diagram of a handhald PC in"
     instead of "FIG. 3 illustrates a schematic diagram a handheld PC in"

Column 3, lines 24-25:
   should read in part -- "qualifies as a triggering event. If it does, then the event monitoring program ..."
         instead of "qualifies as a triggering event. If it does, then the even monitoring program ..."

Column 4, line 3:
   should read in part -- "...The system bus 223 may be any of"
      instead of "...The system bus 23 may be any of"

Signed and Sealed this
Eighteenth Day of October, 2011

David J. Kappos
*Director of the United States Patent and Trademark Office*